United States Patent Office 3,509,090
Patented Apr. 28, 1970

3,509,090
POLYCARBONATES STABILIZED WITH HALOGEN-CONTAINING ORGANO SILICON COMPOUNDS
Gerald W. Miller, Pittsburgh, Pa., assignor to Mobay Chemical Company, Pittsburgh, Pa., a corporation of Delaware
No Drawing. Filed Mar. 18, 1968, Ser. No. 714,030
Int. Cl. C08g 51/58
U.S. Cl. 260—45.7          8 Claims

ABSTRACT OF THE DISCLOSURE

Self-extinguishing, internally lubricated thermoplastics stabilized against thermal degradation with a stabilizing amount of a halophenyl triorganosilane, a halonaphthyl triorganosilane, a bis-(halophenyl)-diorganosilane, a bis-(halonaphthyl)diorganosilane, a tris - (halonaphthyl)organosilane, a tris-(halophenyl)organosilane, a tetra-(halophenyl)silane, a tetra-(halonaphthyl)silane, a halophenoxy triorganosilane, a halonaphthoxy triorganosilane, a bis-(halophenoxy)diorganosilane, a bis-(halonaphthoxy)-diorganosilane, a tris-halophenoxy)organosilane, a tris-(halonaphthoxy)organosilane, a tetra-(halophenoxy)silane, a tetra-(halophenoxy)silane, a poly-(halophenylsilicon) compound, a poly-(halonaphthylsilicon) compound, alkyl substituted homologues of the foregoing and the like and mixtures thereof.

This invention relates to stabilized thermoplastic polymeric materials and more particularly to polycarbonates which are flame-resistant and stabilized against thermal degradation.

Polycarbonate materials are generally prepared by reacting di-(hydroxyaryl) alkanes, di-(hydroxyaryl) sulphones, di-(hydroxyaryl) sulphoxides, di-(hydroxyaryl) sulphites, di-(hydroxyaryl)ethers or other aromatic dihydroxy compounds or mixtures thereof with phosgene, haloformates or diesters of carbonic acid. In general, polycarbonates produced from these and other conventional materials according to conventional processes usually have a yellow or brownish color at the time they are produced, or else they acquire such a color upon standing. Further, the polycarbonate plastic often becomes discolored while being reheated during casting or other shaping processes in the presence of air, thus making it undesirable for the preparation of shaped articles where it is important that the material from which the article is prepared is colorless.

Although polycarbonate plastics have been classified as self-extinguishing materials by ASTM standards, and although such polymers have a relatively high temperature resistance, polycarbonate plastics are still unsuitable for many applications because they are not sufficiently flame-resistant. In order to cure this deficiency it has been proposed to use some type of high temperature material such as fiberglass with the polycarbonate to increase its temperature resistance. Although such expedients have been known to increase the heat resistance of polycarbonates by about 10° F., such a result is not sufficient to render polycarbonates sufficiently flameproof for those applications in which non-flammability is essential.

It has also been proposed to coat polycarbonate parts with a heat resistant material such as a phenolic, an epoxy or even with metal coatings of various types. However, such expedients leave much to be desired when the application requires that the integral polymer itself be flameproof or flame-resistant.

Another problem encountered in the molding or casting of thermoplastics and particularly polycarbonates is the attainment of the adequate release of that material from molding or casting surfaces. Release agents applied to the molding or casting surfaces themselves leave much to be desired since they are inefficient, require repeated reapplications and often mar the surface of the material being cast or molded upon them. Internal release agents have also been commercially unfeasible due to the adverse effects they often exert on the properties of thermoplastics.

It is therefore an object of this invention to provide a polycarbonate material which is devoid of the foregoing disadvantages.

It is also an object of this invention to provide stabilizers for polycarbonates which are equally efficacious for thermoplastics generally.

Another object of the invention is to provide a method for stabilizing thermoplastics in general and polycarbonates in particular against thermal degradation.

Still another object of this invention is to provide a nonflammable or flame-proof thermoplastic composition.

A further object of this invention is to provide a polycarbonate plastic stabilized against thermal degradation and the resulting discoloration attendant thereon.

A still further object of the invention is to provide a method for preventing the discoloration of a thermoplastic due to thermal degradation.

The foregoing objects and other which will become apparent from the following description are accomplished in accordance with this invention, generally speaking, by providing flame-proof, thermally stable and easily released thermoplastic materials in general and polycarbonate in particular having incorporated therein a stabilizing amount of a halophenyl triorganosilane, a halonaphthyl triorganosilane, a bis - (halophenyl)diorganosilane, a bis - (halonaphthyl)diorganosilane, a tris-(halophenyl)organosilane, a tris-(halonaphthyl)organosilane, a tetra-(halophenyl)-silane, a tetra-(halonaphthyl)silane, a halophenoxy triorganosilane, a halonaphthoxy triorganosilane, a bis-(halophenoxy)diorganosilane, a bis-(halonaphthoxy)diorganosilane, a tris - (halophenoxy)organosilane, a tris - (halonaphthoxy)organosilane, a tetra-(halophenoxy)silane, a tetra-(halonaphthoxy)silane, alkyl substituted homologues of the foregoing wherein the alkyl substituent is on the phenyl or naphthyl ring such as in a halo-alkylphenyl triorganosilane, a halo-alkylnaphthyl triorganosilane, a bis - (halo-alkylphenyl)diorganosilane, a bis - (halo-alkylnaphthyl)diorganosilane, a tris-(halo-alkylphenyl)organosilane, a tris-(halo-alkylnaphthyl)organosilane, a tetra-(halo-alkylphenyl)silane, a tetra-(halo-alkylnaphthyl)silane, a halo-alkylphenoxy triorganosilane, a halo-alkyl naphthoxy triorganosilane, a bis-(halo-alkylphenoxy)diorganosilane, a bis-(halo-alkylnaphthoxy)diorganosilane, a tris-(halo-alkylphenoxy)organosilane, a tris-(halo-alkylnaphthoxy)organosilane, a tetra-(halo-alkylphenoxy)silane, a tetra-(halo-alkylnaphthoxy)silane and the like wherein the organo group may be any suitable alkyl, aryl, alkoxy or aryloxy grouping or mixtures thereof; preferably the alkyl and alkoxy groups having 1 to 18 carbon atoms and the aryl and aryloxy groups are phenyl, napthyl, phenanthryl, anthryl and the like; a poly(halophenylsilicon) compound of the formulae:

I

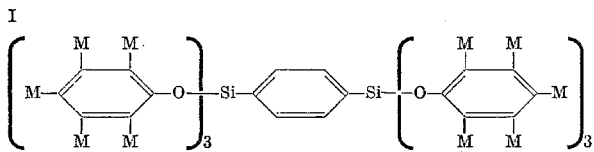

II

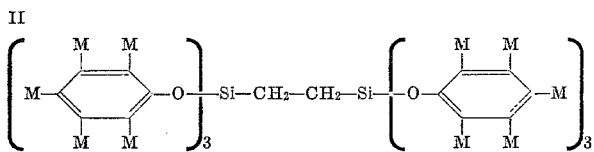

III

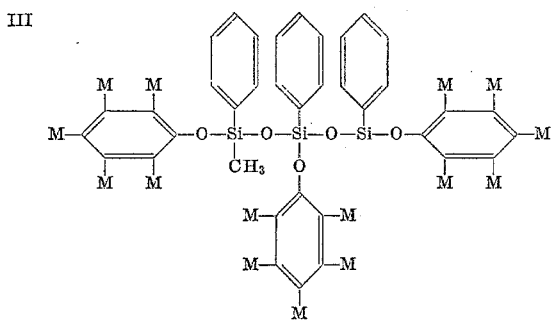

a poly (halonaphthylsilicon) compound of the formula

IV

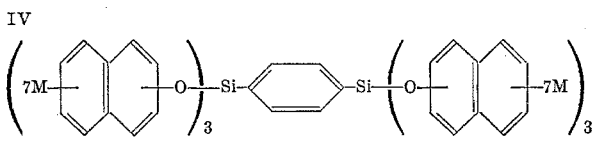

V

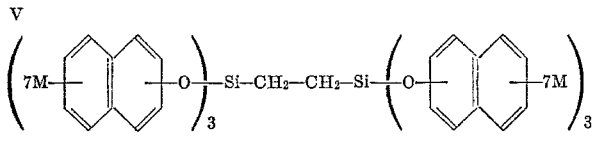

VI

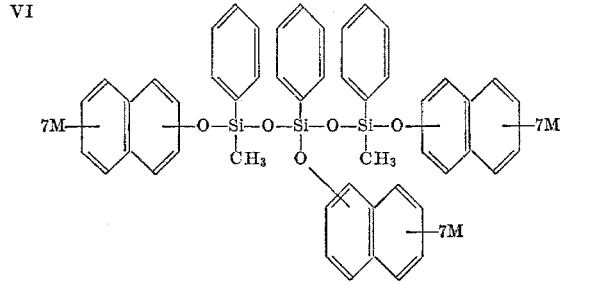

and mixtures thereof, wherein M is the same or different hydrogen atom, alkyl group, preferably having from 1 to 18 carbon atoms or any suitable halogen atom such as fluorine, chlorine, bromine, iodine and the like and mixtures thereof, but preferably chlorine and bromine, at least one M on each substituted ring being chlorine or bromine.

The thermoplastics in general, and polycarbonates in particular, to be stabilized in accordance with this invention are self-extinguishing Class one-type materials which resist thermal degradation and therefore do not become discolored under continued exposure to heat. In addition, a synergistic effect has been observed inasmuch as only very small quantities of the stabilizers of this invention are necessary in order to yield a self-extinguishing thermoplastic polymer which is resistant to thermal degradation, particularly during extrusion processes.

Although the stabilizers of this invention may be used in any desired stabilizing concentration, quantities of from about 0.1% to about 25% by weight are generally sufficient to render a thermoplastic self-extinguishing and resistant to thermal degradation and preferably, from about 4% to about 10% by weight of the stabilizer is used. It must be emphasized however that greater quanities of the stabilizer of this invention may be employed and that the upper limit of the concentration range to be used is circumscribed only by economics. Particularly when being used to stabilize polycarbonates, the stabilizers of this invention may be incorporated into a polycarbonate polymer without the corresponding deleterious effects on the mechanical properties of the polycarbonate which are observed when other thermal stabilizers such as trialkylphosphites have been used. It is therefore entirely unexpected that the stabilizers of this invention will render a polycarbonate self-extinguishing and resistant to thermal degradation while at the same time having no deleterious effect on the physical and mechanical properties of the polycarbonate polymer itself, even when used at high concentrations.

In addition, the stabilizers of this invention act as an internal release agent in the thermoplastic materials into which they are incorporated. As a consequence, the flame-proof, thermally stable compositions of this invention are also readily molded or cast by any desired method since they may be easily separated from molding or casting surfaces. The stabilizing quantities of the stabilizer of this invention are usually sufficient to also yield the desired degree of internal lubrication; however, if such is not the case, additional quantities of the stabilizers of this invention may be used without any deleterious effect on the properties of the polymer. Clearly, the quantity of the stabilizers of this invention which is necessary to yield adequate internal lubrication will vary depending on the type of polymer being lubricated and the particular characteristics of a particular polymer within any one class. Hence, the instant concept is not circumscribed by a specific concentration limitation, since the determination thereof is well within the skill of the art.

The stabilizers of this invention may be mixed with the thermoplastic polymer to be stabilized and/or lubricated by any suitable means. A convenient method for adding the stabilizers is to spray a solution thereof onto granules of the polymer. The stabilizers of this invention may also be introduced during the preparation of the polymer, particularly if the polymer is a polycarbonate; for example, they can be added to polycarbonates produced by an esterification process while the esterification is being effected. When a polycarbonate is produced by the phosgenation of a dihydroxy compound, a more or less viscous solution is usually formed which, after being washed free of electrolytes, can be mixed with the stabilizers of this invention or a solution thereof to obtain an essentially homogeneous dispersion. It is sometimes advantageous to add the instant stabilizers to the thermoplastic polymer by passing already shaped articles such as bristles spun from the polymer through a bath containing the dissolved stabilizers, in which case a film of the stabilizer is deposited on the bristles upon evaporation of the solvent. Further, the stabilizers of this invention may be thoroughly distributed in a resin by simply mixing the materials together by any of the variety of methods normally employed for the incorporation of plasticizers or fillers into thermoplastic polymers including, but not limited to mixing rolls, dough mixers, Banbury mixers, extruders and other mixing equipment.

Any suitable polycarbonate may be stabilized in accordance with this invention. For example, the carbonate polymers may be prepared by reacting a dihydric phenol with carbonate precursors such as phosgene, a haloformate or a carbonate ester. Some suitable reactants and processes for the preparation of polycarbonates are set forth, for example, in Canadian Patent 578,585; 578,795; 594,805 and U.S. Patents 3,028,365; 2,970,131; 2,991,273; 2,999,-

835; 3,014,891 as well as in Chemistry and Physics of Polycarbonates by Herman Schnell and Polycarbonates by William F. Christopher and Daniel W. Fox.

Generally, all polycarbonate plastics are subject to discoloration regardless of the compounds from which they are formed or the process used in forming them, and all polycarbonate resins can be treated according to the process of this invention, particularly, all high-molecular weight substantially linear thermoplastic polycarbonates. As indicated hereinbefore, the polycarbonate plastic can be produced from a dihydroxy diarylalkane and phosgene or a diester of carbonic acid such as, for example, by the process disclosed by Schnell et al. in Canadian Patent 578,585. Another suitable method for preparing the polycarbonate plastic to be stabilized in accordance with this invention is described in U.S. Patent 3,271,367 which discusses dihydroxydiaryl sulphones. Other polycarbonates which can be stabilized against discoloration in accordance with this invention are disclosed in U.S. Patents 2,999,846 and 3,062,781. Since the foregoing Canadian and U.S. patents are incorporated into this application by reference, a detailed description of methods for making polycarbonates need not be set forth herein. Suffice it to say that any and all polycarbonates may be treated according to the process of this invention, particularly those which are of the greatest commercial importance and which have molecular weights of at least about 10,000 and most preferably between about 25,000 and 150,000.

Any other suitable thermoplastic resin may be stabilized in accordance with this invention. For example, some other polymeric materials which can be so stabilized are polysulfones, polyamides, polypropylene oxides, polyethylene oxides, polyurethanes, Polymer 360, a product of the Minnesota Mining and Manufacturing Corporation, polyolefins such as polyethylene, polypropylene and the like, polyethylene terephthalate and polyesters and copolyesters in general, and any other type of thermoplastic material which is susceptible to thermal degradation and which is flammable.

In all of these cases, any amount of the stabilizers of this invention will stabilize the polycarbonate polymer against discoloration and will even reduce and in some cases do away with all of the discoloration which usually takes place in the polycarbonate polymer after it is formed. Some specific examples of the stabilizers of this invention which may be used include, for example, (4-bromophenyl)trimethylsilane,
(2-chlorophenyl)tripropylsilane,
(2,4-dibromophenyl)triethylsilane,
(3,5-dichlorophenyl)triphenylsilane,
(3,4-dichlorophenyl)triphenylsilane,
(4-bromo-2-fluorophenyl)trinaphthylsilane,
(2,4,6-tribromophenyl)tributylsilane,
(2,4,6-trichlorophenyl)triphenylsilane,
(2,6-dichlorophenyl)triethylsilane,
(3,4-dibromophenyl)trinaphthylsilane,
(2,4-dibromo-6-fluorophenyl)trianthylsilane,
(2,4,6-tribromophenyl)triphenanthrylsilane,
(2,4,6-dibromophenyl)dimethylphenylsilane,
(2-chloro-6-fluorophenyl)diphenylnaphthylsilane,
(2,3,4,6-tetrabromophenyl)tripropylsilane,
(2,3,4,6-tetrachlorophenyl)triphenylsilane,
(2,3,4-tribromo-6-fluorophenyl)diphenylnaphthylsilane,
(2,3,4-trichloro-6-fluorophenyl)methylethylpropylsilane,
(2,3-dibromo-4,6-dichlorophenyl)propylphenylbutylsilane,
(2-chloro-4,6-dibromophenyl)tripropylsilane,
pentabromophenyl tripropylsilane,
pentachlorophenyl triphenylsilane,
(2,4,6-trichloro-3,5-dibromophenyl)triphenylsilane,
(2,4,6-tribromo-3,5-dichlorophenyl)trinaphthylsilane,
(2,4,6-tribromo-3,5-difluorophenyl)methylethylpropylsilane,
(2,4,6-tribromo-3,5-dichlorophenyl)triphenylsilane,
(2,4,6-trichloro-3,5-dibromophenyl)naphthylpropylbutylsilane,
(2-chloro-a-naphthyl)trimethylsilane,
(4-bromo-a-naphthyl)tripropylsilane,
(2,4-dibromo-a-naphthyl)triphenylsilane,
(2,4-dichloro-a-naphthyl)propyldibutylsilane,
(2,5-dibromo-a-naphthyl)phenylnaphthylanthrylsilane,
(2,5-dichloro-a-naphthyl)tributylsilane,
(2,4,6-tribromophenyl)trimethylsilane,
2,4,6-trichlorophenyl)tripropylsilane,
(2,6-dibromo-4-chlorophenyl)triphenylsilane,
(2,6-dichloro-4-bromophenyl)triethylsilane,
(4-bromophenyl)tridodecylsilane,
(4-chlorophenyl)nonyldecyldodecylsilane,
(2,6-difluoro-4-bromophenyl)phenylnaphthylanthrylsilane,
(2-fluoro-4,6-dichlorophenyl)naphthylanthrylphenanthrylsilane,
(2-chloro-a-naphthyl)tripropylsilane,
(4-bromo-a-naphthyl)triphenylsilane,
(2,4-dichloro-a-naphthyl)phenylnaphthylanthrylsilane,
(2,4-dibromo-a-naphthyl)butyldecylphenylsilane,
(2,4-dichloro-a-naphthyl)tributylsilane,
(2,4-dibromo-a-naphthyl)trinaphthylsilane,
(1-bromo-b-naphthyl)triphenylsilane,
(4-chloro-b-naphthyl)dibutylphenylsilane,
(2,5-dichloro-a-naphthyl)tributylsilane,
(1,4-dibromo-b-naphthyl)tripropylsilane,
(2-chloro-7-bromo-a-naphthyl)tripentylsilane,
(1,5-dibromo-b-naphthyl)trinaphthylsilane,
(1-bromo-7-chloro-b-naphthyl)tridecylsilane,
2-bromo-4-chloro-5-fluoro-a-naphthyl)tributylsilane,
(1,4-dibromo-3,6-dichloro-5,8-difluoronaphthyl)tributylsilane,
heptabromonaphthyl tripropylsilane,
heptachloronaphthyltriphenylsilane,
(2,4,6-tribromo-a-naphthyl)butylheptyldodecylsilane,
(2,3,6,7-tetrachloro-a-naphthyl)tritetradecylsilane,
(2,3,6,7-tetrabromo-4,5-difluoronaphthyl)diphenylmethylsilane,
(3,5-dibromotolyl)trimethylsilane,
(3,5-dichlorotolyl)tripropylsilane,
(3,5-dibromo-2,6-dichlorotolyl)triphenylsilane,
(2-fluoro-3-bromotolyl)methylethylpropylsilane,
(2,3,5,6-tetrabromotolyl)trinaphthylislane,
(2,3,5,6-tetrachlorotolyl)propylbutylphenylsilane,
(2-bromotolyl)trianthrylsilane,
(3-bromotolyl)phenylnaphthylanthrylsilane,
(2-chlorotolyl)tridecylsilane,
(3-chlorotolyl)trioctadecylsilane,
(2-bromocumenyl)trinaphthylsilane,
(2-chlorocumenyl)tridecylsilane,
(2,6-dibromocumenyl)trinaphthylsilane,
(2,6-dichlorocumenyl)triphenanthrylsilane,
(2,3,6-tribromocumenyl)tributylsilane,
(2,3,6-trichlorocumenyl)naphthylanthrylphenanthryl silane,
(2-bromo-6-fluorocumenyl)triethylsilane,
(2-bromo-6-fluorocumenyl)trioctadecylsilane,
(2,6-difluoro-3-bromocumenyl)phenylnaphthylanthrylsilane,
(2-chloro-7-bromo-a-naphthoxy)tripentylsilane,
(1,5-dibromo-b-naphthoxy)trinaphthylsilane,
(1-bromo-7-chloro-b-naphthoxy)tridecylsilane,
(2-bromo-4-chloro-5-fluoro-a-naphthoxy)tributylsilane,
(1,4-dibromo-3,6-dichloro-5,8-difluoronaphthoxy)tributylsilane,
heptabromonaphthoxy tripropylsilane,
heptachloronaphthoxytriphenylsilane,
(2,4,6-tribromo-a-naphthoxy)butylheptyldodecylsilane,
(2,3,6,7-tetrachloro-a-naphthoxy)tritetradecylsilane,
(2,3,6,7-tetrabromo-4,5-difluoronaphthoxy)diphenylmethylsilane,
(3,5-dibromotolyloxy)trimethylsilane,
(3,5-dichlorotolyloxy)tripropylsilane, (3,5-dibromo-2,6-dichlorotolyloxy)triphenylsilane,
(2-fluoro-3-bromotolyloxy)methylethylpropylsilane,
(2,3,5,6-tetrabromotolyloxy)trinaphthylsilane,
(2,3,5,6-tetrachlorotolyloxy)propylbutylphenylsilane,
(2-bromotolyloxy)trianthrylsilane,
(3-bromotolyloxy)phenylnaphthylanthrylsilane,
(2-chlorotolyloxy)tridecylsilane,
(3-chlorotolyloxy)trioctadecylsilane,
(2-bromocumenoxy)trinaphthylsilane,
(2-chlorocumenoxy)tridecylsilane,
(2,6-dibromocumenoxy)trinaphthylsilane,
(2,6-dichlorocumenoxy)triphenanthrylsilane,
(2,3,6-tribromocumenoxy)tributylsilane,
(2,3,6-trichlorocumenoxy)naphthylanthrylphenanthryl silane,
(2-bromo-6-fluorocumenoxy)triethylsilane,
(2-bromo-6-fluorocumenoxy)trioctadecylsilane,
(2,6-difluoro-3-bromocumenoxy)phenylnaphthylanthryl silane, (4-bromophenoxy)trimethylsilane,
(2-chlorophenoxy)tripropylsilane,
(2,4-dibromophenoxy)triethylsilane,
(3,5-dichlorophenoxy)triphenylsilane,
(3,4-dichlorophenoxy)triphenylsilane,
(4-bromo-2-fluorophenoxy)trinaphthylsilane,
(2,4,6-tribromophenoxy)tributylsilane,
(2,4,6-trichlorophenoxy)tripentylsilane,
(2,6-dichlorophenoxy)triethylsilane,
(3,4-dibromophenoxy)trinaphthylsilane,
(2,4-dibromo-6-fluorophenoxy)trianthylsilane,
(2,4,6-tribromophenoxy)triphenanthrylsilane,
(2,4,6-dibromophenoxy)dimethylphenylsilane,
(2-chloro-6-fluorophenoxy)diphenylnaphthylsilane,
(2,3,4,6-tetrabromophenoxy)tripropylsilane,
(2,3,4,6-tetrachlorophenoxy)triphenylsilane,
(2,3,4-tribromo-6-fluorophenoxy)diphenylnaphthylsilane,
(2,3,4-trichloro-6-fluorophenoxy)methylethylpropylsilane,
(2,3-dibromo-4,6-dichlorophenoxy)propylphenylbutyl silane,
(2-chloro-4,6-dibromophenoxy)tripropylsilane,
pentabromophenoxy tripropylsilane,
pentachlorophenoxy triphenylsilane,
(2,4,6-trichloro-3,5-dibromophenoxy)triphenylsilane,
(2,4,6-tribromo-3,5-dichlorophenoxy)trinaphthylsilane,
(2,4,6-tribromo-3,5-difluorophenoxy)-methylethylpropyl silane,
(2,4,6-tribromo-3,5-dichlorophenoxy)triphenylsilane,
(2,4,6-trichloro-3,5-dibromophenoxy)naphthylpropyl butylsilane,
(2-chloro-a-naphthoxy)trimethylsilane,
(4-bromo-a-naphthoxy)tripropylsilane,
(2,4-dibromo-a-naphthoxy)triphenylsilane,
(2,4-dichloro-a-naphthoxy)propyldibutylsilane,
(2,5-dibromo-a-naphthoxy)phenylnaphthylanthrylsilane,
(2,5-dichloro-a-naphthoxy)tributylsilane,
(2,4,6-tribromophenoxy)trimethylsilane,
(2,4,6-trichlorophenoxy)tripropylsilane,
(2,6-dibromo-4-chlorophenoxy)triphenylsilane,
(2,6-dichloro-4-bromophenoxy)triethylsilane,
(4-bromophenoxy)tridodecylsilane,
(4-chlorophenoxy)nonyldecyldodecylsilane,
(2,6-difluoro-4-bromophenoxy)phenylnaphthylanthryl silane,
(2-fluoro-4,6-dichlorophenoxy)naphthylanthrylphenan thrylsilane,
(2-chloro-a-naphthoxy)tripropylsilane,
(4-bromo-a-naphthoxy)triphenylsilane,
(2,4-dichloro-a-naphthoxy)phenylnaphthylanthrylsilane,
(2,4-dibromo-a-naphthoxy)butyldecylphenylsilane,
(2,4-dichloro-a-naphthoxy)tributylsilane,
(2,4-dibromo-a-naphthoxy)trinaphthylsilane,
(1-bromo-b-naphthoxy)triphenylsilane,
(4-chloro-b-naphthoxy)dibutylphenylsilane,
(2,5-dichloro-a-naphthoxy)tributylsilane,
(1,4-dibromo-b-naphthoxy)tripropylsilane, bis-(4-bromophenyl)dimethylsilane,
bis-(2-chlorophenyl)dipropylsilane,
bis-(2,4-dibromophenyl)diethylsilane,
bis-(3,5-dichlorophenyl)diphenylsilane,
bis-(3,4-dichlorophenyl)diphenylsilane,
bis-(4-bromo-2-fluorophenyl)dinaphthylsilane,
bis-(2,4,6-tribromophenyl)dibutylsilane,
bis-(2,4,6-trichlorophenyl)dipentylsilane,
bis-(2,6-dichlorophenyl)diethylsilane,
bis-(3,4-dibromophenyl)dinaphthylsilane,
bis-(2,4-dibromo-6-fluorophenyl)dianthylsilane,
bis-(2,4,6-tribromophenyl)diphenanthrylsilane,
bis-(2,4,6-dibromophenyl)methylphenylsilane,
bis-(2-chloro-6-fluorophenyl)phenylnaphthylsilane,
bis-(2,3,4,6-tetrabromophenyl)dipropylsilane,
bis-(2,3,4,6-tetraclorophenyl)diphenylsilane,
bis-(2,3,4-tribromo-6-fluorophenyl)phenylnaphthylsilane,
bis-(2,3,4-trichloro-6-fluorophenyl)ethylpropylsilane,
bis-(2,3-dibromo-4,6-dichlorophenyl)propylbutylsilane.
bis-(2-chloro-4,6-dibromophenyl)dipropylsilane,
bis-(pentabromophenyl)dipropylsilane,
bis-(pentachlorophenyl)diphenylsilane,
bis-(2,4,6-trichloro-3,5-dibromophenyl)diphenylsilane,
bis-(2,4,6-tribromo-3,5-dichlorophenyl)dinaphthylsilane,
bis-(2,4,6-tribromo-3,5-difluorophenyl)methylpropyl silane,
bis-(2,4,6-tribromo-3,5-dichlorophenyl)diphenylsilane,
bis-(2,4,6-trichloro-3,5-dibromophenylpropylbutylsilane,
bis-(2-chloro-a-naphthyl)dimethylsilane,
bis-(4-bromo-a-naphthyl)dipropylsilane,
bis-(2,4-dibromo-a-naphthyl)diphenylsilane,
bis-(2,4-dichloro-a-naphthyl)propylbutylsilane,
bis-(2,5-dibromo-a-naphthyl)phenylnaphthylsilane,
bis-(2,5-dichloro-a-naphthyl)dibutylsilane,
bis-(2,4,6-tribromophenyl)dimethylsilane,
bis-(2,4,6-trichlorophenyl)dipropylsilane,
bis-(2,6-dibromo-4-chlorophenyl)diphenylsilane,
bis-(2,6-dichloro-4-bromophenyl)diethylsilane,
bis-(4-bromophenyl)didodecylsilane,
bis-(4-chlorophenyl)nonyldecylsilane,
bis-(2,6-difluoro-4-bromophenyl)phenylnaphthylsilane,
bis-(2-fluoro-4,6-dichlorophenyl)anthrylphenanthryl silane,
bis-(2-chloro-a-naphthyl)dipropylsilane,
bis-(4-bromo-a-naphthyl)diphenylsilane,
bis-(2,4-dichloro-a-naphthyl)naphthylanthrylsilane,
bis-(2,4-dibromo-a-naphthyl)butylphenylsilane,
bis-(2,4-dichloro-a-naphthyl)dibutylsilane,
bis-(2,4-dibromo-a-naphthyl)dinaphthylsilane,
bis-(1-bromo-b-naphthyl)diphenylsilane,
bis-(4-chloro-b-naphthyl)butylphenylsilane,
bis-(2,5-dichloro-a-naphthyl)dibutylsilane,
bis-(1,4-dibromo-b-naphthyl)dipropylsilane,
bis-(2-chloro-7-bromo-a-naphthyl)dipentylsilane,
bis-(1,5-dibromo-b-naphthyl)dinaphthylsilane,
bis-(1-bromo-7-chloro-b-naphthyl)didecylsilane,
bis-(2-bromo-4-chloro-5-fluoro-a-naphthyl)dibutylsilane,
bis-(1,4-dibromo-3,6-dichloro-5,8-difluoronaphthyl)di butylsilane,
bis-(heptabromonaphthyl)dipropylsilane,
bis-(heptachloronaphthyl)diphenylsilane,
bis-(2,4,6-tribromo-a-naphthyl)butyldodecylsilane,
bis-(2,3,6,7-tetrachloro-a-naphthyl)ditetradecylsilane,
bis-(2,3,6,7-tetrabromo-4,5-difluoronaphthyl)diphenyl silane,
bis-(3,5-dibromotolyl)dimethylsilane,
bis-(3,5-dichlorotolyl)dipropylsilane,
bis-(3,5-dibromo-2,6-dichlorotolyl)diphenylsilane,
bis-(2-fluoro-3-bromotolyl)methylethylsilane,
bis-(2,3,5,6-tetrabromotolyl)dinaphthylsilane,
bis-(2,3,5,6-tetrachlorotolyl)propylbutylsilane,
bis-(2-bromotolyl)dianthrylsilane,
bis-(3-bromotolyl)phenylnaphthylsilane,
bis-(2-chlorotolyl)didecylsilane,
bis-(3-chlorotolyl)dioctadecylsilane, bis-(2-bromocumenyl)dinaphthylsilane,
bis-(2-chlorocumenyl)didecylsilane,
bis-(2,6-dibromocumenyl)dinaphthylsilane,
bis-(2,6-dichlorocumenyl)-diphenanthrylsilane,
bis-(2,3,6-tribromocumenyl)dibutylsilane,
bis-(2,3,6-trichlorocumenyl)naphthylanthrylsilane,
bis-(2-bromo-6-fluorocumenyl)-diethylsilane,
bis-(2-bromo-6-fluorocumenyl)dioctadecylsilane,
bis-(2,6-difluoro-3-bromocumenyl)phenylnaphthylsilane,
bis-(2-chloro-7-bromo-a-naphthoxy)diphenylsilane,
bis-(1,5-dibromo-b-naphthoxy)dinaphthylsilane,
bis-(1-bromo-7-chloro-b-naphthoxy)didecylsilane,
bis-(2-bromo-4-chloro-5-fluoro-a-naphthoxy)dibutylsilane,
bis-(1,4-dibromo-3,6-dichloro-5,8-difluoronaphthoxy)dibutylsilane,
bis-(heptabromonaphthoxy)dipropylsilane,
bis-(heptachloronaphthoxy)diphenylsilane,
bis-(2,4,6-tribromo-a-naphthoxy)butyldodecylsilane,
bis-(2,3,6,7-tetrachloro-a-naphthoxy)ditetradecylsilane,
bis-(2,3,6,7-tetrabromo-4,5-difluoronaphthoxy)diphenylsilane,
bis-(3,5-dibromotolyloxy)dimethylsilane,
bis-(3,5-dichlorotolyloxy)dipropylsilane,
bis-(3,5-dibromo-2,6-dichlorotolyloxy)diphenylsilane,
bis-(2-fluoro-3-bromotolyloxy)ethylpropylsilane,
bis-(2,3,5,6-tetrabromotolyloxy)naphthylsilane,
bis-(2,3,5,6-tetrachlorotolyloxy)butylphenylsilane,
bis-(2-bromotolyloxy)anthrylsilane,
bis-(3-bromotolyloxy)naphthylanthrylsilane,
bis-(2-chlorotolyloxy)didecylsilane,
bis-(3-chlorotolyloxy)dioctadecylsilane,
bis-(2-bromocumenoxy)dinaphthylsilane,
bis-(2-chlorocumenoxy)didecylsilane,
bis-(2,6-dibromocumenoxy)dinaphthylsilane,
bis-(2,6-dichlorocumenoxy)diphenanthrylsilane,
bis-(2,3,6-tribromocumenoxy)dibutylsilane,
bis-(2,3,6-trichlorocumenoxy)anthrylphenanthrylsilane,
bis-(2-bromo-6-fluorocumenoxy)diethylsilane,
bis-(2-bromo-6-fluorocumenoxy)dioctadecylsilane,
bis-(2,6-difluoro-3-bromocumenoxy)naphthylanthrylsilane,
bis-(4-bromophenoxy)dimethylsilane,
bis-(2,4-dibromophenoxy)diethylsilane,
bis-(3,5-dichlorophenoxy)diphenylsilane,
bis-(3,4-dichlorophenoxy)diphenylsilane,
bis-(4-bromo-2-fluorophenoxy)dinaphthylsilane,
bis-(2,4,6-tribromophenoxy)dibutylsilane,
bis-(2,4,6-trichlorophenoxy)diphenylsilane,
bis-(2,6-dichlorophenoxy)diethylsilane,
bis-(3,4-dibromophenoxy)dinaphthylsilane,
bis-(2,4-dibromo-6-fluorophenoxy)dianthylsilane,
bis-(2,4,6-tribromophenoxy)diphenanthrylsilane,
bis-(2,4,6-dibromophenoxy)methylphenylsilane,
bis-(2-chloro-6-fluorophenoxy)phenylnaphthylsilane,
bis-(2,3,4,6-tetrabromophenoxy)dipropylsilane,
bis-(2,3,4,6-tetrachlorophenoxy)diphenylsilane,
bis-(2,3,4-tribromo-6-fluorophenoxy)phenylnaphthylsilane,
bis-(2,3,4-trichloro-6-fluorophenoxy)ethylpropylsilane,
bis-(2,3-dibromo-4,6-dichlorophenoxy)propylbutylsilane,
bis-(2-chloro-4,6-dibromophenoxy)dipropylsilane,
bis-(pentabromophenoxy)dipropylsilane,
bis-(pentachlorophenoxy)diphenylsilane,
bis-(2,4,6-trichloro-3,5-dibromophenoxy)diphenylsilane,
bis-(2,4,6-tribromo-3,5-dichlorophenoxy)dinaphthylsilane,
bis-(2,4,6-tribromo-3,5-difluorophenoxy)methylpropylsilane,
bis-(2,4,6-tribromo-3,5-dichlorophenoxy)diphenylsilane,
bis-(2,4,6-trichloro-3,5-dibromophenoxy)-naphthylbutylsilane,
bis-(2-chloro-a-naphthoxy)dimethylsilane,
bis-(4-bromo-a-naphthoxy)dipropylsilane,
bis-(2,4-dibromo-a-naphthoxy)diphenylsilane,
bis-(2,4-dichloro-a-naphthoxy)propylbutylsilane,
bis-(2,5-dibromo-a-naphthoxy)naphthylanthrylsilane,
bis-(2,5-dichloro-a-naphthoxy)dibutylsilane,
bis-(2,5-dichloro-a-naphthoxy)dibutylsilane,
bis-(2,4,6-tribromophenoxy)dimethylsilane,
bis(2,4,6-trichlorophenoxy)dipropylsilane,
bis-(2,6-dibromo-4-chlorophenoxy)diphenylsilane,
bis-(2,6-dichloro-4-bromophenoxy)diethylsilane,
bis-(4-bromophenoxy)didodecylsilane,
bis-(4-chlorophenoxy)nonyldecylsilane,
bis-(2,6-difluoro-4-bromophenoxy)phenylnaphthylsilane,
bis-(2-fluoro-4,6-dichlorophenoxy)anthrylphenanthrylsilane,
bis-(2-chloro-a-naphthoxy)dipropylsilane,
bis-(4-bromo-a-naphthoxy)diphenylsilane,
bis-(2,4-dichloro-a-naphthoxy)phenylnaphthylsilane,
bis-(2,4-dibromo-a-naphthoxy)butylphenylsilane,
bis-(2,4-dichloro-a-naphthoxy)dibutylsilane,
bis-(2,4-dibromo-a-naphthoxy)dinaphthylsilane,
bis-(1-bromo-b-naphthoxy)diphenylsilane,
bis-(4-chloro-b-naphthoxy)butylphenylsilane,
bis-(2,5-dichloro-a-naphthoxy)dibutylsilane,
bis-(1,4-dibromo-b-naphthoxy)dipropylsilane,
tri-(4-bromophenyl)methylsilane,
tri-(2-chlorophenyl)propylsilane,
tri-(2,4-dibromophenyl)ethylsilane,
tri-(3,5-dichlorophenyl)phenylsilane,
tri-(3,4-dichlorophenyl)phenylsilane,
tri-(4-bromo-2-fluorophenyl)naphthylsilane,
tri-(2,4,6-tribromophenyl)butylsilane,
tri-(2,4,6-trichlorophenyl)pentylsilane,
tri-(2,6-dichlorophenyl)ethylsilane,
tri-(3,4-dibromophenyl)naphthylsilane,
tri-(2,4-dibromo-6-fluorophenyl)anthrylsilane,
tri-(2,4,6-tribromophenyl)phenanthrylsilane,
tri-(2,4,6-dibromophenyl)phenylsilane,
tri-(2-chloro-6-fluorophenyl)naphthylsilane,
tri-(2,3,4,6-tetrabromophenyl)propylsilane,
tri-(2,3,4,6-tetrachlorophenyl)phenylsilane,
tri-(2,3,4-tribromo-6-fluorophenyl)naphthylsilane,
tri-(2,3,4-trichloro-6-fluorophenyl)propylsilane,
tri-(2,3-dibromo-4,6-dichlorophenyl)butylsilane,
tri-(2-chloro-4,6-dibromophenyl)propylsilane,
tri-(pentabromophenyl)propylsilane,
tri-(pentachlorophenyl)phenylsilane,
tri-(2,4,6-trichloro-3,5-dibromophenyl)phenylsilane,
tri-(2,4,6-tribromo-3,5-dichlorophenyl)naphthylsilane,
tri-(2,4,6-tribromo-3,5-difluorophenyl)propylsilane,
tri-(2,4,6-tribromo-3,5-dichlorophenyl)phenylsilane,
tri-(2,4,6-trichloro-3,5-dibromophenyl)propylsilane,
tri-(2-chloro-a-naphthyl)methylsilane,
tri-(4-bromo-a-naphthyl)propylsilane,
tri-(2,4-dibromo-a-naphthyl)phenylsilane,
tri-(2,4-dichloro-a-naphthyl)butylsilane,
tri-(2,5-dibromo-a-naphthyl)anthrylsilane,
tri-(2,5-dichloro-a-naphthyl)butylsilane,
tri-(2,4,6-tribromophenyl)methylsilane,
tri-(2,4,6-trichlorophenyl)propylsilane,
tri-2,6-dibromo-4-chlorophenyl)phenylsilane,
tri-(2,6-dichloro-4-bromophenyl)ethylsilane,
tri-(4-bromophenyl)dodecylsilane,
tri-(4-chlorophenyl)nonylsilane,
tri-(2,6-difluoro-4-bromophenyl)anthrylsilane,
tri-(2-fluoro-4,6-dichlorophenyl)phenanthrylsilane,
tri-(2-chloro-a-naphthyl)propylsilane,
tri-(4-bromo-a-naphthyl)phenylsilane,
tri-(2,4-dichloro-a-naphthyl)anthrylsilane,
tri-(2,4-dibromo-a-naphthyl)decylsilane,
tri-(2,4-dichloro-a-naphthyl)butylsilane,
tri-(2,4-dibromo-a-naphthyl)naphthylsilane,
tri-(1-bromo-b-naphthyl)phenylsilane,
tri-(4-chloro-b-naphthyl)phenylsilane,
tri-(2,5-dichloro-a-naphthyl)butylsilane,
tri-(1,4-dibromo-b-naphthyl)propylsilane,
tri-(2-chloro-7-bromo-a-naphthyl)pentylsilane, tri-(1,5-dibromo-b-naphthyl)naphthylsilane,
tri-(1-bromo-7-chloro-b-naphthyl)decylsilane,
tri-(2-bromo-4-chloro-5-fluoro-a-naphthyl)butylsilane,
tri-(1,4-dibromo-3,6-dichloro-5,8-difluoronaphthyl)
  butylsilane,
tri-(heptabromonaphthyl)propylsilane,
tri-(heptachloronaphthyl)phenylsilane,
tri-(2,4,6-tribromo-a-naphthyl)dodecylsilane,
tri-(2,3,6,7-tetrachloro-a-naphthyl)tetradecylsilane,
tri-(2,3,6,7-tetrabromo-4,5-difluoronaphthyl)methyl-
  silane,
tri-(3,5-dibromotolyl)methylsilane,
tri-(3,5-dichlorotolyl)propylsilane,
tri-(3,5-dibromo-2,6-dichlorotolyl)phenylsilane,
tri-(2-fluoro-3-bromotolyl)propylsilane,
tri-(2,3,5,6-tetrabromotolyl)naphthylsilane,
tri-(2,3,5,6-tetrachlorotolyl)phenylsilane,
tri-(2-bromotolyl)anthrylsilane,
tri-(3-bromotolyl)anthrylsilane,
tri-(2-chlorotolyl)decylsilane,
tri-(3-chlorotolyl)octadecylsilane,
tri-(2-bromocumenyl)naphthylsilane,
tri-(2-chlorocumenyl)decylsilane,
tri-(2,6-dibromocumenyl)naphthylsilane,
tri-(2,6-dichlorocumenyl)phenanthrylsilane,
tri-(2,3,6-tribromocumenyl)butylsilane,
tri-(2,3,6-trichlorocumenyl)phenanthrylsilane,
tri-(2-bromo-6-fluorocumenyl)ethylsilane,
tri-(2-bromo-6-fluorocumenyl)octadecylsilane,
tri-(2,6-difluoro-3-bromocumenyl)anthrylsilane,
tri-(2-chloro-7-bromo-a-naphthoxy)pentylsilane,
tri-(1,5-dibromo-b-naphthoxy)naphthylsilane,
tri-(1-bromo-7-chloro-b-naphthoxy)decylsilane,
tri-(2-bromo-4-chloro-5-fluoro-a-naphthoxy)butylsilane,
tri-(1,4-dibromo-3,6-dichloro-5,8-difluoronaphthoxy)
  butylsilane,
tri-(heptabromonaphthoxy)propylsilane,
tri-(heptachloronaphthoxy)phenylsilane,
tri-(2,4,6-tribromo-a-naphthoxy)tetradecylsilane,
tri-(2,3,6,7-tetrabromo-4,5-difluoronaphthoxy)methyl-
  silane,
tri-(3,5-dibromotolyloxy)methylsilane,
tri-(3,5-dichlorotolyloxy)propylsilane,
tri-(3,5-dibromo-2,6-dichlorotolyloxy)phenylsilane,
tri-(2-fluoro-3-bromotolyloxy)propylsilane,
tri-(2,3,5,6-tetrabromotolyloxy)naphthylsilane,
tri-(2,3,5,6-tetrachlorotolyloxy)phenylsilane,
tri-(2-bromotolyloxy)anthrylsilane,
tri-(3-bromotolyloxy)anthrylsilane,
tri-(2-chlorotolyloxy)decylsilane,
tri-(3-chlorotolyloxy)decylsilane,
tri-(2-bromocumenoxy)naphthylsilane,
tri-(2-chlorocumenoxy)decylsilane,
tri-(2,6-dibromocumenoxy)naphthylsilane,
tri-(2,6-dichlorocumenoxy)phenanthrylsilane,
tri-(2,3,6-tribromocumenoxy)butylsilane,
tri-(2,3,6-trichlorocumenoxy)phenanthrylsilane,
tri-(2-bromo-6-fluorocumenoxy)ethylsilane,
tri-(2-bromo-6-fluorocumenoxy)octadecylsilane,
tri-(2,6-difluoro-3-bromocumenoxy)anthrylsilane,
tri-(4-bromophenoxy)methylsilane,
tri-(2-chlorophenoxy)propylsilane,
tri-(2,4-dibromophenoxy)ethylsilane,
tri-(3,5-dichlorophenoxy)phenylsilane,
tri-(3,4-dichlorophenoxy)phenylsilane,
tri-(4-bromo-2-fluorophenoxy)naphthylsilane,
tri-(2,4,6-tribromophenoxy)butylsilane,
tri-(2,4,6-trichlorophenoxy)pentylsilane,
tri-(2,6-dichlorophenoxy)ethylsilane,
tri-(3,4-dibromophenoxy)naphthylsilane,
tri-(2,4-dibromo-6-fluorophenoxy)anthylsilane,
tri-(2,4,6-tribromophenoxy)phenanthrylsilane,
tri-(2,4,6-dibromophenoxy)phenylsilane,
tri-(2-chloro-6-fluorophenoxy)naphthylsilane,
tri-(2,3,4,6-tetrabromophenoxy)propylsilane,
tri-(2,3,4,6-tetrachlorophenoxy)phenylsilane,
tri-2,3,4-tribromo-6-fluorophenoxy)naphthylsilane,
tri-(2,3,4-trichloro-6-fluorophenoxy)propylsilane,
tri-(2,3-dibromo-4,6-dichlorophenoxy)butylsilane,
tri-(2-chloro-4,6-dibromophenoxy)propylsilane,
tri-(pentabromophenoxy)propylsilane,
tri-(pentachlorophenoxy)phenylsilane,
tri-(2,4,6-trichloro-3,5-dibromophenoxy)phenylsilane,
tri-(2,4,6-tribromo-3,5-dichlorophenoxy)naphthylsilane,
tri-(2,4,6-tribromo-3,5-difluorophenoxy)propylsilane,
tri-(2,4,6-tribromo-3,5-dichlorophenoxy)phenylsilane,
tri-(2,4,6-trichloro-3,5-dibromophenoxy)butylsilane,
tri-(2-chloro-a-naphthoxy)methylsilane,
tri-(4-bromo-a-naphthoxy)propylsilane,
tri-(2,4-dibromo-a-naphthoxy)phenylsilane,
tri-(2,4-dichloro-a-naphthoxy)butylsilane,
tri-(2,5-dibromo-a-naphthoxy)anthrylsilane,
tri-(2,5-dichloro-a-naphthoxy)butylsilane,
tri-(2,4,6-tribromophenoxy)methylsilane,
tri-(2,4,6-trichlorophenoxy)propylsilane,
tri-(2,6-dibromo-4-chlorophenoxy)phenylsilane,
tri-(2,6-dichloro-4-bromophenoxy)ethylsilane,
tri-(4-bromophenoxy)dodecylsilane,
tri-(4-chlorophenoxy)nonylsilane,
tri-(2,6-difluoro-4-bromophenoxy)anthrylsilane,
tri-(2-fluoro-4,6-dichlorophenoxy)phenanthrylsilane,
tri-(2-chloro-a-naphthoxy)propylsilane,
tri-(4-bromo-a-naphthoxy)phenylsilane,
tri-(2,4-dichloro-a-naphthoxy)anthrylsilane,
tri-(2,4-dibromo-a-naphthoxy)phenylsilane,
tri-(2,4-dichloro-a-naphthoxy)butylsilane,
tri-(2,4-dibromo-a-naphthoxy)naphthylsilane,
tri-(1-bromo-b-naphthoxy)phenylsilane,
tri-(4-chloro-b-naphthoxy)phenylsilane,
tri-(2,5-dichloro-a-naphthoxy)butylsilane,
tri-(1,4-dibromo-b-naphthoxy)propylsilane,
tetra-(4-bromophenoxyl)silane,
tetra-(2-chlorophenoxyl)silane,
tetra-(2,4-dibromophenyl)silane,
tetra-(3,5-dichlorophenyl)silane,
tetra-(3,4-dichlorophenyl)silane,
tetra-(4-bromo-2-fluorophenyl)silane,
tetra-(2,4,6-tribromophenyl)silane,
tetra-(2,4,6-trichlorophenyl)silane,
tetra-(2,6-dichlorophenyl)silane,
tetra-(3,4-dibromophenyl)silane,
tetra-(2,4-dibromo-6-fluorophenyl)silane,
tetra-(2,4,6-tribromophenyl)silane,
tetra-(2,4,6-dibromophenyl)silane,
tetra-(2-chloro-6-fluorophenyl)silane,
tetra-(2,3,4,6-tetrabromophenyl)silane,
tetra-(2,3,4,6-tetrachlorophenyl)silane,
tetra-(2,3,4-tribromo-6-fluorophenyl)silane,
tetra-(2,3,4-trichloro-6-fluorophenyl)silane,
tetra-(2,3-dibromo-4,6-dichlorophenyl)silane,
tetra-(2-chloro-4,6-dibromophenyl)silane,
tetra-(pentabromophenyl)silane,
tetra-(pentachlorophenyl)silane,
tetra-(2,4,6-trichloro-3,5-dibromophenyl)silane,
tetra-(2,4,6-tribromo-3,5-dichlorophenyl)silane,
tetra-(2,4,6-tribromo-3,5-difluorophenyl)silane,
tetra-(2,4,6-tribromo-3,5-dichlorophenyl)silane,
tetra-(2,4,6-trichloro-3,5-dibromophenyl)silane,
tetra-(2-chloro-a-naphthyl)silane,
tetra-(4-bromo-a-naphthyl)silane,
tetra-(2,4-dibromo-a-naphthyl)silane,
tetra-(2,4-dichloro-a-naphthyl)silane,
tetra-(2,5-dibromo-a-naphthyl)silane,
tetra-(2,5-dichloro-a-naphthyl)silane,
tetra-(2,4,6-tribromophenyl)silane,
tetra-(2,4,6-trichlorophenyl)silane,
tetra-(2,6-dibromo-4-chlorophenyl)silane,
tetra-(2,6-dichloro-4-bromophenyl)silane,
tetra-(4-bromophenyl)silane,
tetra-(4-chlorophenyl)silane, tetra-(2,6-difluoro-4-bromophenyl)silane,
tetra-(2-fluoro-4,6-dichlorophenyl)silane,
tetra-(2-chloro-a-naphthyl)silane,
tetra-(4-bromo-a-naphthyl)silane,
tetra-(2,4-dichloro-a-naphthyl)silane,
tetra-(2,4-dibromo-a-naphthyl)silane,
tetra-(2,4-dichloro-a-naphthyl)silane,
tetra-(2,4-dibromo-a-naphthyl)silane,
tetra-(1-bromo-b-naphthyl)silane,
tetra-(4-chloro-b-naphthyl)silane,
tetra-(2,5-dichloro-a-naphthyl)silane,
tetra-(1,4-dibromo-b-naphthyl)silane,
tetra-(2-chloro-7-bromo-a-naphthyl)silane,
tetra-(1,5-dibromo-b-naphthyl)silane,
tetra-(1-bromo-7-chloro-b-naphthyl)silane,
tetra-(2-bromo-4-chloro-5-fluoro-a-naphthyl)silane,
tetra - (1 - 4-dibromo-3,6-dichloro-5,8-difluoronaphthyl)-silane,
tetra-(heptabromonaphthyl)silane,
tetra-(heptachloronaphthyl)silane,
tetra-(2,4,6-tribromo-a-naphthyl)silane,
tetra-(2,3,6,7-tetrachloro-a-naphthyl)silane,
tetra-(2,3,6,7-tetrabromo-4,5-difluoronaphthyl)silane,
tetra-(3,5-dibromotolyl)silane,
tetra-(3,5-dichlorotolyl)silane,
tetra-(3,5-dibromo-2,6-dichlorotolyl)silane,
tetra-(2-fluoro-3-bromotolyl)silane,
tetra-(2,3,5,6-tetrabromotolyl)silane,
tetra-(2,3,5,6-tetrachlorotolyl)silane,
tetra-(2-bromotolyl)silane,
tetra-(3-bromotolyl)silane,
tetra-(2-chlorotolyl)silane,
tetra-(3-chlorotolyl)silane,
tetra-(2-bromocumenyl)silane,
tetra-(2-chlorocumenyl)silane,
tetra-(2,6-dibromocumenyl)silane,
tetra-(2,6-dichlorocumenyl)silane,
tetra-(2,3,6-tribromocumenyl)silane,
tetra-(2,3,6-trichlorocumenyl)silane,
tetra-(2-bromo-6-fluorocumenyl)silane,
tetra-(2-bromo-6-fluorocumenyl)silane,
tetra-(2,6-difluoro-3-bromocumenyl)silane,
tetra-(2-chloro-7-bromo-a-naphthoxy)silane,
tetra-(1,5-dibromo-b-naphthoxy)silane,
tetra-(1-bromo-7-chloro-b-naphthoxy)silane,
tetra-(2-bromo-4-chloro-5-fluoro-a-naphthoxy)silane,
tetra - (1,4-dibromo-3,6-dichloro-5,8-difluoronaphthoxy)-silane,
tetra-(heptabromonaphthoxy)silane,
tetra-(heptachloronaphthoxy)silane,
tetra-(2,4,6-tribromo-a-naphthoxy)silane,
tetra-(2,3,6,7-tetrachloro-a-naphthoxy)silane,
tetra-(2,3,6,7-tetrabromo-4,5-difluoronaphthoxy)silane,
tetra-(3,5-dibromotolyloxy)silane,
tetra-(3,5-dichlorotolyloxy)silane,
tetra-(3,5-dibromo-2,6-dichlorotolyloxy)silane,
tetra-(2-fluoro-4-bromotolyloxy)silane,
tetra-(2,3,5,6-tetrabromotolyloxy)silane,
tetra-(2,3,5,6-tetrachlorotolyloxy)silane,
tetra-(2-bromotolyloxy)silane,
tetra-(3-bromotolyloxy)silane,
tetra-(2-chlorotolyloxy)silane,
tetra-(3-chlorotolyloxy)silane,
tetra-(2-bromocumenoxy)silane,
tetra-(2-chlorocumenoxy)silane,
tetra-(2,6-dibromocumenoxy)silane,
tetra-(2,6-dichlorocumenoxy)silane,
tetra-(2,3,6-tribromocumenoxy)silane,
tetra-(2,3,6-trichlorocumenoxy)silane,
tetra-(2-bromo-6-fluorocumenoxy)silane,
tetra-(2-bromo-6-fluorocumenoxy)silane,
tetra-(2,6-difluoro-3-bromocumenoxy)silane,
tetra-(4-bromophenoxy)silane,
tetra-(2-chlorophenoxy)silane,
tetra-(2,4-dibromophenoxy)silane,
tetra-(3,5-dichlorophenoxy)silane,
tetra-(3,4-dichlorophenoxy)silane,
tetra-(4-bromo-2-fluorophenoxy)silane,
tetra-(2,4,6-tribromophenoxy)silane,
tetra-(2,4,6-trichlorophenoxy)silane,
tetra-(2,6-dichlorophenoxy)silane,
tetra-(3,4-dibromophenoxy)silane,
tetra-(2,4-dibromo-6-fluorophenoxy)silane,
tetra-(2,4,6-tribromophenoxy)silane,
tetra-(2,4,6-dibromophenoxy)silane,
tetra-(2-chloro-6-fluorophenoxy)silane,
tetra-(2,3,4,6-tetrabromophenoxy)silane,
tetra-(2,3,4,6-tetrachlorophenoxy)silane,
tetra-(2,3,4-tribromo-6-fluorophenoxy)silane,
tetra-(2,3,4-trichloro-6-fluorophenoxy)silane,
tetra-(2,3-dibromo-4,6-dichlorophenoxy)silane,
tetra-(2-chloro-4,6-dibromophenoxy)silane,
tetra-(pentabromophenoxy)silane,
tetra-(pentachlorophenoxy)silane,
tetra-(2,4,6-trichloro-3,5-dibromophenoxy)silane,
tetra-(2,4,6-tribromo-3,5-dichlorophenoxy)silane,
tetra-(2,4,6-tribromo-3,5-difluorophenoxy)silane,
tetra-(2,4,6-tribromo-3,5-dichlorophenoxy)silane,
tetra-(2,4,6-trichloro-3,5-dibromophenoxy)silane,
tetra-(2-chloro-a-naphthoxy)silane,
tetra-(4-bromo-a-naphthoxy)silane,
tetra-(2,4-dibromo-a-naphthoxy)silane,
tetra-(2,4-dichloro-a-naphthoxy)silane,
tetra-(2,5-dibromo-a-naphthoxy)silane,
tetra-(2,5-dichloro-a-naphthoxy)silane,
tetra-(2,4,6-tribromophenoxy)silane,
tetra-(2,4,6-trichlorophenoxy)silane,
tetra-(2,6-dibromo-4-chlorophenoxy)silane,
tetra-(2,6-dichloro-4-bromophenoxy)silane,
tetra-(4-bromophenoxy)silane,
tetra-(4-chlorophenoxy)silane,
tetra-(2,6-difluoro-4-bromophenoxy)silane,
tetra-(2-fluoro-4,6-dichlorophenoxy)silane,
tetra-(2-chloro-a-naphthoxy)silane,
tetra-(4-bromo-a-naphthoxy)silane,
tetra-(2,4-dibromo-a-naphthoxy)silane,
tetra-(2,4-dichloro-a-naphthoxy)silane,
tetra-(2,4-dibromo-a-naphthoxy)silane,
tetra-(1-bromo-b-naphthoxy)silane,
tetra-(4-chloro-b-naphthoxy)silane,
tetra-(2,5-dichloro-a-naphthoxy)silane,
tetra-(1,4-dibromo-b-naphthoxy)silane,
and mixtures thereof.

Some specific examples of stabilizers within the scope of Formulae I and II which may be used in the practice of this invention include any suitable 1,2-tris-(halophenyloxy)disilyl-1,4-phenylene, 1,2-tris-(halo-alkylphenoxy)disilyl-1,4-phenylene, 1,2 - tris-(halophenoxy)disilyl-1,2-ethylene and 1,2-tris-(halo-alkylphenoxy)disilyl-1,2-ethylene such as, for example, 1,2-tri-(2,4,6-tribromophenoxy)disilyl-1,4-phenylene,
1,2-tri-(2,4,6-trichlorophenoxy)disilyl-1,4-phenylene,
1,2-tri-(4-bromophenoxy)disilyl-1,4-phenylene,
1,2-tri-(2-chlorophenoxy)disilyl-1,4-phenylene,
1,2-tri-(2,4-dibromophenoxy)disilyl-1,4-phenylene,
1,2-tri-(3,5-dichlorophenoxy)disilyl-1,4-phenylene,
1,2-tri-(4-bromo-2-fluorophenoxy)disilyl-1,4-phenylene,
1,2-tri-(2,6-dichlorophenoxy)disilyl-1,4-phenylene,
1,2-tri-(3,4-dibromophenoxy)disilyl-1,4-phenylene,
1,2-tri-(2,4-dichloro-6-bromophenoxy)disilyl-1,4-phenylene,
1,2-tri-(2,6-dibromo-6-methylphenoxy)disilyl-1,4-phenylene,
1,2-tri-(2-propyl-4-chloro-6-pentylphenoxy)disilyl-1,4-phenylene,
1,2-tri-(2-octadecyl-4-bromo-6-chlorophenoxy)disilyl-1,4-phenylene,
1,2-tri-(2-bromo-4-fluoro-6-chlorophenoxy)disilyl-1,4-phenylene, 1,2-tri-(2,6-dibromo-6-cyclohexylphenoxy)disilyl-1,4-phenylene,
1,2-tri-(pentabromophenoxy)disilyl-1,4-phenylene,
1,2-tri-(pentachlorophenoxy)disilyl-1,4-phenylene,
1,2-tri-(2,3,5,6-tetrachlorophenoxy)disilyl-1,4-phenylene,
1,2-tri-(2,3,5,6-tetrabromophenoxy)disilyl-1,4-phenylene,
1,2-tri-(4-chlorophenoxy)disilyl-1,4-phenylene,
1,2-tri-(2,4,6-tribromophenoxy)disilyl-1,2-ethylene,
1,2-tri-(2,4,6-trichlorophenoxy)disilyl-1,2-ethylene,
1,2-tri-(4-bromophenoxy)disilyl-1,2-ethylene,
1,2-tri-(2-chlorophenoxy)disilyl-1,2-ethylene,
1,2-tri-(2,4-dibromophenoxy)disilyl-1,2-ethylene,
1,2-tri-(3,5-dichlorophenoxy)disilyl-1,2-ethylene,
1,2-tri-(4-bromo-2-methylphenoxy)disilyl-1,2-ethylene,
1,2-tri-(2,6-dichloro-4-hexylphenoxy)disilyl-1,2-ethylene,
1,2-tri-(3,4-dibromophenoxy)disilyl-1,2-ethylene,
1,2-tri-(2,4-dichloro-6-bromophenoxy)disilyl-1,2-ethylene,
1,2-tri-(2,6-dibromo-6-decylphenoxy)disilyl-1,2-ethylene,
1,2-tri-(2,6-dipropyl-4-chlorophenoxy)disilyl-1,2-ethylene,
1,2-tri-(2-octadecyl-4-bromo-6-chlorophenoxy)disilyl-1,2-ethylene,
1,2-tri-(2-bromo-4-fluoro-6-chlorophenoxy)disilyl-1,2-ethylene,
1,2-tri-(pentabromophenoxy)disilyl-1,2-ethylene,
1,2-tri-(pentachlorophenoxy)disilyl-1,2-ethylene,
1,2-tri-(2,3,5,6-tetrabromophenoxy)disilyl-1,2-ethylene,
1,2-tri-(2,3,5,6-tetrachlorophenoxy)disilyl-1,2-ethylene,
1,2-tri-(4-chlorophenoxy)disilyl-1,2-ethylene,
1,2-tri-(2,6-dichloro-4-cyclohexylphenoxy)disilyl-1,2-ethylene,
and mixtures thereof.

Some specific examples of stabilizers within the scope of Formula III which may be used in the practice of this invention include any suitable 1,2,3-tri-(halophenoxy)-1,2,3-triphenyl-1,3-dimethyltrisiloxone and 1,2,3-tri-(haloalkylphenoxy) - 1,2,3 - triphenyl-1,3-dimethyl trisiloxane, such as, for example, 1,2,3-tri-(2,4,6-tribromophenoxy)-1,2,3-triphenyl-1,3-dimethyl trisiloxane,
1,2,3-tri-(2,4,6-trichlorophenoxy)-1,2,3-triphenyl-1,3-dimethyl trisiloxane,
1,2,3-tri-(4-bromophenoxy)-1,2,3-triphenyl-1,3-dimethyl trisiloxane,
1,2,3-tri-(2-chlorophenoxy)-1,2,3-triphenyl-1,3-dimethyl trisiloxane,
1,2,3-tri-(2,4-dibromophenoxy)-1,2,3-triphenyl-1,3-dimethyl trisiloxane,
1,2,3-tri-(3,5-dichlorophenoxy)-1,2,3-triphenyl-1,3-dimethyl trisiloxane,
1,2,3-tri-(4-bromo-2-methylphenoxy)-1,2,3-triphenyl-1,3-dimethyl trisiloxane,
1,2,3-tri-(2,6-dichloro-4-hexylphenoxy)-1,2,3-triphenyl-1,3-dimethyl trisiloxane,
1,2,3-tri-(3,4-dibromophenoxy)-1,2,3-triphenyl-1,3-dimethyl trisiloxane,
1,2,3-tri-(2,4-dichloro-6-bromophenoxy)-1,2,3-triphenyl-1,3-dimethyl trisiloxane,
1,2,3-tri-(2,6-dibromo-6-decylphenoxy)-1,2,3-triphenyl-1,3-dimethyl trisiloxane,
1,2,3-tri-(2,6-dipropyl-4-chlorophenoxy)-1,2,3-triphenyl-1,3-dimethyl trisiloxane,
1,2,3-tri-(2-octadecyl-4-bromo-6-chlorophenoxy)-1,2,3-triphenyl-1,3-dimethyl trisiloxone,
1,2,3-tri-(2-bromo-4-fluoro-6-chlorophenoxy)-1,2,3-1,2,3-triphenyl-1,3-dimethyl trisiloxane,
1,2,3-tri-(pentabromophenoxy)-1,2,3-triphenyl-1,3-dimethyl trisiloxane,
1,2,3-tri-(pentachlorophenoxy)-1,2,3-triphenyl-1,3-dimethyl trisiloxane,
1,2,3-tri-(2,3,5,6-tetrabromophenoxy)-1,2,3-triphenyl-1,3-dimethyl trisiloxane,
1,2,3-tri-(2,3,5,6-tetrachlorophenoxy)-1,2,3-triphenyl-1,3-dimethyl trisiloxane,
1,2,3-tri-(2,6-dibromo-4-cyclohexylphenoxy)-1,2,3-triphenyl-1,3-dimethyl trisiloxane,
and mixtures thereof.

Some specific examples of stabilizers within the scope of Formulae IV and V which may be used in the practice of this invention include any suitable 1,2-tris-(halonaphthoxy)disilyl-1,4-phenylene, 1,2-tris-(halo-alkylnaphthoxy)disilyl-1,4 - phenylene, 1,2-tris-(halonaphthoxy)disilyl - 1,2 - ethylene and 1,2-tris-(halo alkylnaphthoxy)disilyl-1,2-ethylene such as, for example, 1,2-tri-(2,4-dibromo-a-naphthoxy)disilyl-1,4-phenylene,
1,2-tri-(2-chloro-a-naphthoxy)disilyl-1,4-phenylene,
1,2-tri-(3-bromo-a-naphthoxy)disilyl-1,4-phenylene,
1,2-tri-(2,3,5,6,7-pentabromo-4-iodo-a-naphthoxy)disilyl-1,4-phenylene,
1,2-tri-(2,6-difluoro-4,8-dibromo-a-naphthoxy)disilyl-1,4-phenylene,
1,2-tri-(4,5-dibromo-b-naphthoxy)disilyl-1,4-phenylene,
1,2-tri-(4,5-dichloro-b-naphthoxy)disilyl-1,4-phenylene,
1,2-tri-(2,4,5,7-tetrabromo-a-naphthoxy)disilyl-1,4-phenylene,
1,2-tri-(2,4,5,7-tetrachloro-a-naphthoxy)disilyl-1,4-phenylene,
1,2-tri-(heptachloro-a-naphthoxy)disilyl-1,4-phenylene,
1,2-tri-(heptabromo-a-naphthoxy)disilyl-1,4-phenylene,
1,2-tri-(heptachloro-b-naphthoxy)disilyl-1,4-phenylene,
1,2-tri-(heptabromo-b-naphthoxy)disilyl-1,4-phenylene,
1,2-tri-(1,7,8-trichloro-4,5-didecyl-b-naphthoxy)disilyl-1,4-phenylene,
1,2-tri-(1,3,6,7,8-pentabromo-4,5-dimethyl-b-naphthoxy)disilyl-1,4-phenylene,
1,2-tri-(1-methyl-3,6,7,8-tetrachloro-4,5-dipropyl-b-naphthoxy)disilyl-1,4-phenylene,
1,2-tri-(2,3,5,6,7,8-hexabromo-4-octadecyl-a-naphthoxy)disilyl-1,4-phenylene,
1,2-tri-(2,3,6,7,8-pentabromo-4-methyl-5-ethyl-a-naphthoxy)disilyl-1,4-phenylene,
1,2-tri-(1,3,5,6,7,8-hexachloro-4-cyclohexyl-b-naphthoxy)disilyl-1,4-phenylene,
1,2-tri-(1,3,5,6,7,8-hexabromo-4-cyclopentyl-b-naphthoxy)disilyl-1,4-phenylene,
1,2-tri(2,4-dibromo-a-naphthoxy)disilyl-1,2-ethylene,
1,2-tri-(2-chloro-a-naphthoxy)disilyl-1,2-ethylene,
1,2-tri-(3-bromo-a-naphthoxy)disilyl-1,2-ethylene,
1,2-tri-(2,3,5,6,7-pentabromo-4-iodo-a-naphthoxy)disilyl-1,2-ethylene,
1,2-tri-(2,6-difluoro-4,8-dibromo-a-naphthoxy)disilyl-1,2-ethylene,
1,2-tri-(4,5-dibromo-b-naphthoxy)disilyl-1,2-ethylene,
1,2-tri-(4,5-dichloro-b-naphthoxy)disilyl-1,2-ethylene,
1,2-tri-(2,4,5,7-tetrabromo-a-naphthoxy)disilyl-1,2-ethylene,
1,2-tri-(2,4,5,7-tetrachloro-a-naphthoxy)disilyl-1,2-ethylene,
1,2-tri-(heptachloro-a-naphthoxy)disilyl-1,2-ethylene,
1,2-tri-(heptabromo-a-naphthoxy)disilyl-1,2-ethylene,
1,2-tri-(heptachloro-b-naphthoxy)disilyl-1,2-ethylene,
1,2-tri-(heptabromo-b-naphthoxy)disilyl-1,2-ethylene,
1,2-tri-(1,7,8-trichloro-4,5-didecyl-b-naphthoxy)disilyl-1,2-ethylene,
1,2-tri-(1,3,6,7,8-pentabromo-4,5-dimethyl-b-naphthoxy)disilyl-1,2-ethylene,
1,2-tri-(1-methyl3,6,7,8-tetrachloro-4,5-dipropyl-b-naphthoxy)disilyl-1,2-ethylene,
1,2-tri-(2,3,5,6,7,8-hexabromo-4-octadecyl-a-naphthoxy)disilyl-1,2-ethylene,
1,2-tri-(2,3,6,7,8-pentabromo-4-methyl-5-ethyl-a-naphthoxy)disilyl-1,2-ethylene,
1,2-tri-(1,3,5,6,7,8-hexachloro-4-cyclohexyl-b-naphthoxy)disilyl-1,2-ethylene,
1,2-tri-(1,3,5,6,7,8-hexabromo-4-cyclopentyl-b-naphthoxy)disilyl-12-ethylene, Some specific examples of stabilizers within the scope of Formula VI which may be used in the practice of this invention include any suitable 1,2,3-(halonaphthoxy)-1,2,3 - triphenyl - 1,3 - dimethyl trisiloxane and 1,2,3-tri-(halo - alkylnaphthoxy) - 1,2,3-triphenyl-1,3-dimethyl trisiloxane such as, for example, 1,2,3-tri-(2,4-dibromo-a-naphthoxy)-1,2,3-triphenyl-1,3-dimethyl trisiloxane,
1,2,3-tri-(2-chloro-a-naphthoxy)-1,2,3-triphenyl-1,3-dimethyl trisiloxane,
1,2,3-tri-(3-bromo-a-naphthoxy)-1,2,3-triphenyl-1,3-dimethyl trisiloxane,
1,2,3-tri(2,3,5,6,7-pentabromo-4-iodo-a-naphthoxy)-1,2,3-triphenyl-1,3-dimethyl trisiloxane,
1,2,3-tri-(2,6-difluoro-4,8-dibromo-a-naphthoxy)-1,2,3-triphenyl-1,3-dimethyl trisiloxane,
1,2,3-tri-(4,5-dibromo-b-naphthoxy)-1,2,3-triphenyl-1,3-dimethyl trisiloxane,
1,2,3-tri-(4,5-dichloro-b-naphthoxy)-1,2,3-triphenyl-1,3-dimethyl trisiloxane,
1,2,3-tri-(2,4,5,7-tetrabromo-a-naphthoxy)-1,2,3-triphenyl-1,3-dimethyl trisiloxane,
1,2,3,-tri-(2,4,5,7-tetrachloro-a-naphthoxy)-1,2,3,-triphenyl-1,3-dimethyl trisiloxane,
1,2,3-tri-(heptachloro-a-naphthoxy)-1,2,3-triphenyl-1,3-dimethyl trisiloxane,
1,2,3-tri-(heptabromo-a-naphthoxy)1,2,3-triphenyl-1,3-dimethyl trisiloxane,
1,2,3-tri-(heptachloro-b-naphthoxy)-1,2,3-triphenyl-1,3-dimethyl trisloxane,
1,2,3-tri-(heptabromo-b-naphthoxy)-1,2,3-triphenyl-1,3-dimethyl trisiloxane,
1,2,3-tri-(1,7,8-trichloro-4,5-didecyl-b-naphthoxy)-1,2,3-triphenyl-1,3-dimethyl trisiloxane,
1,2,3-tri-(1,3,6,7,8-pentabromo-4,5-dimethyl-b-naphthoxy)-1,2,3-triphenyl-1,3-dimethyl trisiloxane,
1,2,3-tri-(1-methyl-3,6,7,8-tetrachloro-4,5-dipropyl-b-naphthoxy)-1,2,3-triphenyl-1,3-dimethyl trisiloxane,
1,2,3-tri-(2,3,5,6,7,8-hexabromo-4-octadecyl-a-naphthoxy)-1,2,3-triphenyl-1,3-dimethyl trisiloxane,
1,2,3-tri-(2,3,6,7,8-pentabromo-4-methyl-5-ethyl-a-naphthoxy)-1,2,3-triphenyl-1,3-dimethyl trisiloxane,
1,2,3-tri-(1,3,5,6,7,8-hexachloro-4-cyclohexyl-b-naphthoxy)-1,2,3-triphenyl-1,3-dimethyl trisiloxane,
1,2,3-tri-(1,3,5,6,7,8-hexabromo-4-cyclopentyl-b-naphthoxy)-1,2,3,-triphenyl-1,3-dimethyl trisiloxane,
and mixtures thereof.

Although an extensive listing of compounds has been set forth, it is to be understood that these are merely exemplary and that any and all compounds within the scope of the generic formulae and the classes of compounds set forth herein are operable and contemplated.

The stabilizers of this invention may be prepared by any suitable method such as, for example, any of those outlined in Organosilicon Compounds, C. Eaborn, Butterworth Publishers; Inorganic Polymers, Stone and Graham; Journal of Organic Chemistry, P. D. George and Arthur E. Newkirk, vol. 25, pp. 1645 to 1648, 1960, as well as by any of those methods described in any of the references cited herein.

The stabilized thermoplastics of this invention may be used in any application for which such materials are eminently suitable. For example, they may be used for preparing gaskets, tubing and other materials such as films, foils, coatings, fibers and the like. Because of their improved properties, their self-extinguishing characteristics and their ability to resist thermal degradation, the polycarbonates of this invention are eminently suitable for such applications as well as any other which the polymer will be subjected to heat.

The invention is further illustrated but is not intended to be limited by the following examples in which all parts and percentages are by weight unless otherwise specified.

EXAMPLES 1–11

The stabilizer identified in Table 1 in the quantity set forth therein is mixed with the indicated quantity of a polycarbonate prepared by the phosgenation of 2,2-(4,4'-dihydroxy-diphenyl)propane, and the mixture is extruded and pelletized. The extruded pellets retain the color of the virgin polymer. After being molded into $1/16''$, $1/8''$ and $1/4''$ bars, each configuration passes the UL flammability test as a Class I, self-extinguishing material.

TABLE I

| Number | Additive | Quantity, parts | Polycarbonate molecular weight | Quantity, parts | UL flammability test | | |
|---|---|---|---|---|---|---|---|
| | | | | | $1/16$ | $1/8$ | $1/4$ |
| 1 | Tris-(pentabromophenoxy)-phenyl silane | 5 | 40,000 | 95 | + | + | + |
| 2 | Tetra-(2,4,6-trichlorophenoxy)silane | 10 | 25,000 | 290 | + | + | + |
| 3 | Tris-(pentabromophenyl)methylsilane | 3 | 70,000 | 297 | + | + | + |
| 4 | 1,2,3-triphenyl-1,3-dimethyl-1,2,3-tri-(2,4,6-tribromophenoxy)-trisiloxane | 15 | 40,000 | 85 | + | + | + |
| 5 | 1,2-tris-(2,4,6-tribromophenoxy)-disilyl ethane | 20 | 40,000 | 180 | + | + | + |
| 6 | Tetrakis-(2,4-dichlorophenoxy)silane | 80 | 30,000 | 920 | + | + | + |
| 7 | Tetrakis-(2,4,6-tribromophenyl)silane | 20 | 30,000 | 980 | + | + | + |
| 8 | 1,2,3-(pentabromophenoxy)-1,2,3-triphenyl-1,3-dimethyl trisiloxane | 50 | 35,000 | 450 | + | + | + |
| 9 | Bis-(pentachlorophenoxy)dimethyl silane | 20 | 30,000 | 180 | + | + | + |
| 10 | (Pentabromophenoxy)-(2,7-dibromo-4-chloro-1-naphthoxy)diphenyl silane | 12 | 30,000 | 188 | + | + | + |
| 11 | Tetrakis-(1,4,5-tribromo-1-naphthoxy)-silane | 16 | 50,000 | 184 | + | + | + |

EXAMPLES 12–19

The stabilizer identified in Table II in the quantity set forth therein is mixed with the indicated quantity of the described polymer having the indicated molecular weight and the mixture is extruded and pelletized. The extruded pellets retain the color of the virgin polymer. After being molded into $1/16''$, $1/8''$ and $1/4''$ bars, each configuration passes the UL flammability test as a Class I, self-extinguishing material.

TABLE II

| No. | Additive | Quantity, parts | Polymer | Quantity, parts | Molecular weight | UL flammability test | | |
|---|---|---|---|---|---|---|---|---|
| | | | | | | $1/16''$ | $1/8''$ | $1/4''$ |
| 12 | Tetra-(4-bromophenyl)silane | 10 | Polyamide [1] | 190 | 60,000 | + | + | + |
| 13 | Tetra-(pentabromophenyl)silane | 20 | Styrene-acrylonitrile | 80 | 120,000 | + | + | + |
| 14 | Tris-(4-chloro-2,3,5,6-tetrabromophenoxy)methyl silane | 25 | Polyurethane [2] | 75 | 60,000 | + | + | + |
| 15 | Tetra-(2,4-dibromophenyl)silane | 10 | Polysulfone | 190 | 50,000 | + | + | + |
| 16 | Tetra-(2,4-dichlorophenoxy)silane | 10 | Polyphenylene oxide | 190 | 60,000 | + | + | + |
| 17 | Tetra-(pentabromophenoxy)silane | 20 | Polypropylene | 80 | 200,000 | + | + | + |
| 18 | Tetra-(pentachlorophenoxy)silane | 20 | Polymethylmethacrylate | 80 | 600,000 | + | + | + |
| 19 | 1,2,3-tri-(pentabromophenoxy)-1,2,3-triphenyl-1,3-dimethyl trisiloxane | 25 | Polystyrene | 75 | 200,000 | + | + | + |

[1] The condensation product of hexamethylene diamine and adipic acid.
[2] The reaction product of 4,4'-diphenyl methane diisocyanate, 1,4-butanediol and adipic acid.

It is to be understood that any of the components and conditions mentioned as suitable herein can be substituted for its counterpart in the foregoing examples and that although the invention has been described in considerable detail in the foregoing, such detail is solely for the purpose of illustration. Variations may be made in the invention by those skilled in the art without departing from the spirit and scope of the invention except as is set forth in the claims.

What is claimed is:

1. A self-extinguishing polycarbonate composition stabilized against thermal degradation which comprises a polycarbonate containing a stabilizing amount of a stabilizer selected from the group consisting of a halophenyl triorganosilane, a halonaphthyl triorganosilane, a bis(halophenyl)diorganosilane, a bis(halonaphthyl)diorganosilane, a tris(halophenyl)organosilane, a tris(halonaphthyl)organosilane, a tetra(halophenyl)silane, a tetra(halonaphthyl)silane, a holophenoxy triorganosilane, a halonaphthoxy triorganosilane, a bis(halophenoxy)diorganosilane, a bis(halonaphthoxy)diorganosilane, a tris(halophenoxy)organosilane, a tris(halonaphthoxy)organosilane, a tetra(halophenoxy)silane, a tetra(halonaphthoxy)silane wherein halo is halogen, each phenyl or naphthyl ring containing at least one chlorine or bromine atom, and the organo radical is an alkyl, aryl, alkoxy or aryloxy radical; alkyl substituted homologues of the foregoing wherein the alkyl substituent is on the phenyl or naphthyl ring; poly(halophenylsilicon) compounds of th formulae:

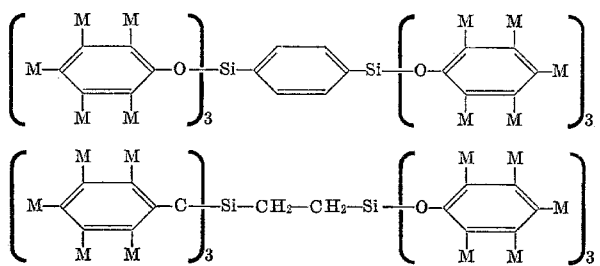

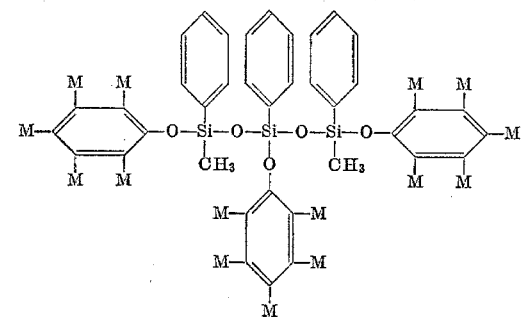

and poly(halonaphthylsilicon) compounds of the formulae:

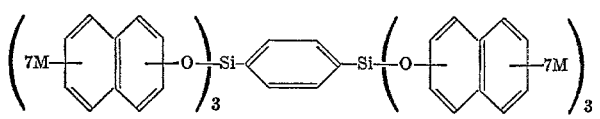

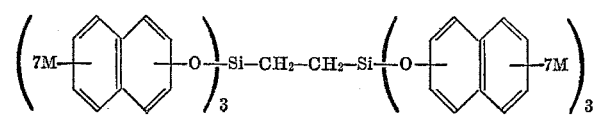

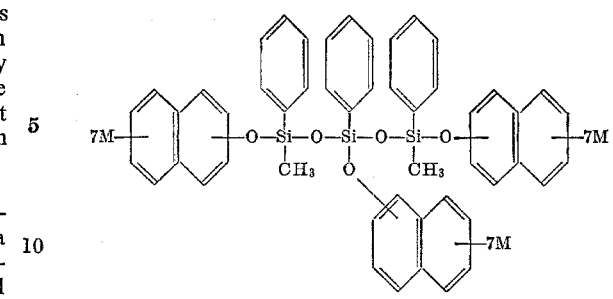

wherein M is a hydrogen atom, alkyl group or halogen atom, at least one M on each ring being chlorine or bromine.

2. The polycarbonate composition of claim 1 containing a lubricating amount of the stabilizer.

3. The polycarbonate composition of claim 1 wherein the stabilizer is tetra-(2,4,6-tribromophenoxy) silicon.

4. The polycabonate composition of claim 1 wherein the stabilizer is tri-(4-bromophenoxy) phenylsilicon.

5. The polycarbonate composition of claim 1 wherein the stabilizer is

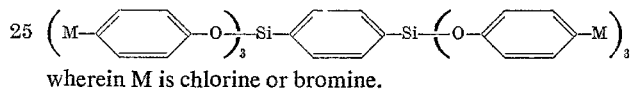

wherein M is chlorine or bromine.

6. The polycarbonate composition of claim 1 wherein the stabilizer is

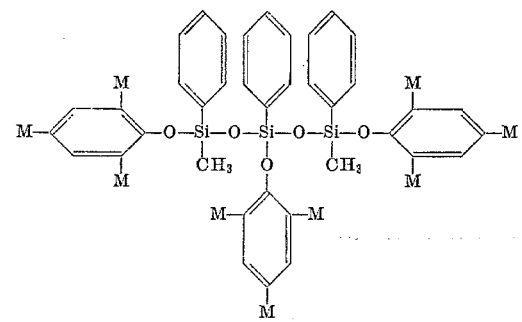

wherein M is chlorine or bromine.

7. The polycarbonate composition of claim 1 wherein the stabilizer is present at a concentration of from about 0.1% to about 25% by weight.

8. The polycarbonate composition of claim 1 wherein the stabilizer is tris-(pentabromophenoxy)phenyl silane, tetra(2,4,6 - trichlorophenoxy)silane, tris(pentabromophenyl)methyl silane, 1,2,3 - triphenyl-1,3-dimethyl-1,2,3-tri(2,4,6 - tribromophenoxy)trisiloxane, 1,2, - tris(2,4,6-tribromophenoxy)disilyl ethane, tetra(2,4 - dichlorophenoxy)silane, tetra(2,4,6 - tribromophenyl)silane, 1,2,3-(pentabromophenoxy) - 1,2,3 - triphenyl - 1,3 - dimethyl trisiloxane, bis(pentachlorophenoxy)dimethyl silane, (pentabromophenoxy) - (2,7 - dibromo-4-chloro-1-naphthoxy)diphenyl silane, tetra(1,4,5-tribromo-a-naphthoxy) silane, tetra(4 - bromophenyl)silane, tetra(pentabromophenyl)silane, tri(4 - chloro-2,3,5,6-tetrabromophenoxy) methyl silane, tetra(2,4-dibromophenyl)silane, tetra(2,4-dichlorophenoxy)silane, tetra(pentabromophenoxy)silane, tetra(pentachlorophenoxy)silane or 1,2,3-tri(pentabromophenoxy)-1,2,3-triphenyl-1,3-dimethyl trisiloxane.

References Cited
UNITED STATES PATENTS

| | | | |
|---|---|---|---|
| 3,021,303 | 2/1962 | Jibben | 260—45.75 |
| 3,100,753 | 8/1963 | Spencer | 260—29.1 |

DONALD E. CZAJA, Primary Examiner

R. A. WHITE, Assistant Examiner